(12) United States Patent
Beenken (10) Patent No.: US 8,737,915 B2
(45) Date of Patent: May 27, 2014

(54) LICENSE PLATES FOR A VEHICLE

(75) Inventor: Bjorn Beenken, Ganderkesee (DE)

(73) Assignee: J. H. Tonnjes E.A.S.T. GmbH & Co. KG, Delmenhorst (DE)

( * ) Notice: Subject to any disclaimer, the term of this patent is extended or adjusted under 35 U.S.C. 154(b) by 10 days.

(21) Appl. No.: 13/125,509

(22) PCT Filed: Nov. 4, 2009

(86) PCT No.: PCT/EP2009/007902
§ 371 (c)(1),
(2), (4) Date: May 28, 2011

(87) PCT Pub. No.: WO2010/051980
PCT Pub. Date: May 14, 2010

(65) Prior Publication Data
US 2011/0258894 A1   Oct. 27, 2011

(30) Foreign Application Priority Data

Nov. 4, 2008  (DE) .......................... 10 2008 055 772
Jul. 16, 2009  (DE) .......................... 10 2009 033 559

(51) Int. Cl.
*H04B 5/00* (2006.01)

(52) U.S. Cl.
CPC .................................. *H04B 5/0062* (2013.01)
USPC ....... 455/41.1; 455/41.2; 455/41.3; 340/10.1; 340/572.7

(58) Field of Classification Search
CPC .................................................... H04B 5/0062
USPC ............ 455/41.1, 41.2, 41.3; 340/10.1, 572.7
See application file for complete search history.

(56) References Cited

U.S. PATENT DOCUMENTS

| | | | | |
|---|---|---|---|---|
| 5,621,571 A | * | 4/1997 | Bantli et al. | 359/529 |
| 6,628,209 B1 | * | 9/2003 | Rother | 340/933 |
| 6,758,405 B2 | * | 7/2004 | Look | 235/494 |
| 7,463,150 B2 | * | 12/2008 | Rajan | 340/572.1 |
| 2008/0042848 A1 | * | 2/2008 | Roberts et al. | 340/572.7 |
| 2009/0021379 A1 | * | 1/2009 | Zhu et al. | 340/572.8 |
| 2009/0058602 A1 | * | 3/2009 | Harinck | 340/10.1 |

FOREIGN PATENT DOCUMENTS

| | | |
|---|---|---|
| DE | 202005018589 U1 | 4/2007 |
| EP | 1903531 A1 | 3/2008 |
| GB | 2429828 A | 3/2007 |
| JP | 2001351083 A | 12/2001 |
| WO | 2008020771 A2 | 2/2008 |

OTHER PUBLICATIONS

IP Australia, Patent Examination Report No. 1, Sep. 23, 2013 (patent search in a related application).
Japanese Patent Offce, Official Action for Japanese Patent Application No. 2011-533624 (related application), Sep. 9, 2013.

* cited by examiner

*Primary Examiner* — Wen Huang
(74) *Attorney, Agent, or Firm* — Laurence P. Colton; Smith Risley Tempel Santos LLC (57) ABSTRACT

In identification devices having a contactlessly readable data carrier (20 equipped with an antenna (17), the antenna (17) assigned to the data carrier (20) is formed by an electrically conductive part of the identification device (10) with a slit (18) provided therein, making the antenna (17) an integral component of the identification device (10), and making a separate antenna (17) redundant.

11 Claims, 9 Drawing Sheets

LICENSE PLATES FOR A VEHICLE

STATEMENT OF RELATED APPLICATIONS

This application claims the benefit of Patent Cooperation Treaty (PCT) International Application No. PCT/EP2009/007902 having International Filing Date 4 Nov. 2009, which claims priority on German Patent Application No. 10 2008 055 772.2 filed on 4 Nov. 2008 and German Patent Application No. 10 2009 033 559.5 filed on 16 Jul. 2009, all of which are incorporated herein by this reference.

BACKGROUND OF THE INVENTION

1. Technical Field

The invention relates to an identification device for a vehicle with a flat, at least partially electrically inductive identification device body, which has at least one indicia area and with at least one indicia, which is assigned to the indicia area of the identification device body, with the identification device body being assigned a data carrier which is contactlessly readable, and an antenna, and with a main body which preferably has a plurality of layers, with one layer being provided with indicia, and with a contactlessly readable data carrier to which an antenna is assigned.

2. Prior Art

The vehicle identification device according to the invention involves so-called license plates that are mounted on the front or rear of a vehicle body or on its front and rear bumpers, or adhesive identification labels that are stuck to a glass panel of the vehicle, in particular as supplementary identification.

Identification devices of the aforementioned types are frequently counterfeited or misused for a different vehicle. To prevent this, identification devices are known which feature a data carrier that can be read contactlessly. This data carrier contains vehicle-relevant data about the vehicle to which the data carrier belongs. These data are read by means of an external reading device. A comparison of the read data with the vehicle on which the identification device is used allows one to draw conclusions concerning misuse, in particular when the identification device has been assigned to a different vehicle.

Hitherto known identification devices with data carriers that can be read contactlessly feature a separate antenna. The antenna is connected to the data carrier with electric conductors for the transmission of the data. Such an identification device is costly and susceptible to malfunction.

BRIEF SUMMARY OF THE INVENTION

The object of the invention is to create a simplified identification device with a data carrier and an antenna.

An identification device, in particular a vehicle license plate, that achieves this object is an identification device for a vehicle with a flat, at least partially electrically inductive identification device body, which has at least one indicia area and with at least one indicia, which is assigned to the indicia area of the identification device body, with the identification device body being assigned a data carrier which is contactlessly readable, and an antenna, characterized in that the data carrier is a data carrier which generates a magnetic field and the antenna is formed by the identification device body that is provided with at least one slit. This identification device has at least one data carrier, which generates a magnetic field, and an antenna, which is formed by the identification device body, which has at least one slit. The identification device body is made at least partially of an electrically conductive material, for example aluminum sheet. The result is an identification device with a transponder comprising a data carrier, which generates a magnetic field, and an antenna. The slit in the at least partially conductive identification device body results in an inductive coupling of the data of the data carrier in the identification device body serving as an antenna. Here the antenna, in particular the slit or the data carrier, serves simultaneously as an amplifier. The data of the data carrier can thus be read at a relatively large distance without any additional components and also without any connections of the data carrier.

According to a preferred development of the invention, it is provided that the data carrier is disposed within the slit in an electronically insulated manner, to be specific, preferably at a closed end of the slit. This makes it possible to accommodate or integrate the data carrier in the identification plate body without requiring additional installation space and that the data carrier cannot be seen from the outside of the identification device.

Preferably, it is provided that the data carrier, in particular its electrically conductive components, make no contact, and in particular specifically no electrically conductive contact, with the identification device body of the identification device. To this end, a circumferential gap or intermediate spacing is formed between the conductive components of the data carrier and the slit in the identification device body, thereby resulting in a particularly effective, contactless coupling of the data carrier to the electrically conductive identification device carrier of the identification device. This coupling is made inductively by means of the magnetic field generated by the data carrier.

In a further preferred development of the identification device, the slit is provided with at least one opening, thus resulting in an enlargement in regions of the slit. Preferably, the opening is assigned to an end of the slit so that the slit end is enlarged by the opening. By arranging the data carrier in the region of the enlargement created by the opening at one end of the slit, sufficient space is also created for larger data carriers in the identification device body. Here the data carrier is situated within the contour of the identification device carrier, specifically without coming into physical or electrical contact with it. The data carrier cannot be perceived in the interior of the identification device, thus providing an invisible electrical or electronic protection of the identification device.

It is preferably provided that the data carrier is fixed in the identification device, namely in the identification device body. Any type of non-conducting means can be considered for fixing the data carrier in the identification device, whereas these means do not have to cover the entire surface of the identification device. In particular, fixation is carried out by means of at least one coating or adhesive layer which covers the identification device body at least partially. The readability of the data of the data carrier is not impaired by the electrically non-conducting coating or adhesive layer. Any attempt to tamper the data carrier would result in easily perceptible damage to the coating or adhesive layer. In an alternative development of the invention, the data carrier is fixed in the slit or opening by a reflective film applied to the visible front side of the identification device body. In this case, the reflective film is demetallized at least in the region of the data carrier, the slit and/or the opening, and thereby made nonconductive.

A development of the identification device is conceivable in which the data carrier is disposed in a receiving depression in the identification device body. The holding recess can be stamped into the identification device body. The data carrier is then attached in this holding recess in an insulating manner to prevent its conductive components from making any conductive connections with the identification device body made of conductive material. This thus results in a magnetic or inductive coupling of in particular a slit of the data carrier to the identification device body. In the process, the identification device body serves not only as an antenna but preferably also as an amplifier at the same time, thus making it possible for the data of the data carrier to be read over a relatively large distance as well.

It is particularly advantageous to provide a base of the depression of the holding recess with a continuous opening that is smaller than the data carrier so that the data carrier can be fixed despite this opening and the depression. The opening results in improved antenna function and, above all, in an improved amplification of the transmission power of the chip of the data carrier.

The data carrier preferably has at least one chip, preferably a passive Radio Frequency Identification Chip (RFID chip), at least one electrically conductive coil and a carrier made of insulating material. The carrier facilitates the fixing of the data carrier in the identification device body. Above all, the carrier, being a nonconductor, ensures that the chip and the coil of the data carrier can be integrated in the identification device and insulated with respect to the identification device body, thus resulting in an inductive or magnetic coupling of the chip's signals to the identification device body of the identification device.

A further identification device for achieving the object stated at the outset is an identification device for a vehicle with a main body which preferably has a plurality of layers, with one layer being provided with indicia, and with a contactlessly readable data carrier, to which an antenna is assigned, characterized in that the data carrier is configured as a data carrier which generates a magnetic field and the antenna comprises at least one layer which is at least partially electrically conductive and with at least one slit-like gap within the electrically conductive layer. In this case, the identification device is a so-called identification label which can be affixed on various parts of a vehicle, specifically on a bumper, on body parts or also on the windshield or other glass panes of the vehicle. The identification label has a main body comprising at least one layer, preferably a plurality of layers, and at least one data carrier that can be read contactlessly, for example a chip module. At least one of the layers is at least partially electrically conductive, while the remaining layers are electrically nonconductive. The electrically conductive layer is interrupted in the form of a slit-like gap, by means of which the electrically conductive layer becomes an antenna. Here the antenna is formed by the electrically conductive layer with the at least one slit-like gap. By virtue of this arrangement, a separate antenna is no longer necessary for the transmission, in particular for the reading, of signals of the data carrier. The slit in the electrically conductive layer cannot be seen on the outer side of the identification label because the electrically conductive layer can have a relatively thin configuration, so that the slit hardly stands out because the conductive layer in the region of the slit must merely be nonconductive. The antenna formed by the conductive layer with the slit-like gap has proven to be quite effective for the wireless transmission of data, in particular as a result of the data carrier being configured as one that generates a magnetic field or which can be operated with a magnetic field. It has been shown that in this special configuration of the identification label the antenna acts simultaneously as an amplifier.

A preferred embodiment of the invention provides that the data carrier is accommodated and electrically insulated inside the slit-like gap in the electrically conductive layer. Consequently, the data carrier has no electrically conductive connection with the electrically conductive layer of the identification device. Instead, according to the invention there is an electromagnetic coupling of the data carrier to the electrically conductive layer of the identification device such that the electrically conductive layer with the slit-like opening can serve as an inductive antenna and preferably also as an amplifier for the data carrier.

The data carrier is electrically insulated from the conductive layer of the identification device preferably in that all conductive components of the data carrier are spaced from the borders of the slit-like gap in the at least partially electrically conductive layer.

A further development of the identification device provides that the data carrier is fixed in the gap of the electrically conductive layer by means of at least one additional, nonconductive layer of the main body. This results in a simple and permanently reliable accommodation of the data carrier inside the electrically conductive layer of the identification device.

It is conceivable to fix the data carrier in or on the slit-like gap in the electrically conductive layer by means of two nonconductive layers arranged on opposite sides of the electrically conductive layer. As a result, the data carrier is completely embedded in the main body. This arrangement makes it impossible to tamper the data carrier as such efforts would necessarily result in damage to at least one layer, thus making any tampering easily ascertainable.

It is advantageous that the at least one layer employed for fixing the data carrier is a coating or a self-adhesive film. It is also conceivable that the at least partially electrically conductive layer is applied to one side of a film, for example by vaporization. During vaporization, the slit-like gap in the electrically conductive layer can be formed at the same time. In this manner it is very simple to form the antenna by the partial attachment of the electrically conductive layer with the slit-like gap to a nonconductive backing film, with no electrically conductive coating being deposited in the region of the data carrier and/or of the gap.

Pursuant to an advantageous configuration of the invention it is conceivable to assign an authenticity feature to at least one of the layers of the identification device. This authenticity feature can preferably be executed as a hologram. It is very difficult to forge such a hologram. This therefore makes the identification device particularly tamper-proof. Preferably, the authenticity feature should be assigned to the electrically conductive layer.

The contactlessly readable data carrier also has a passive chip in the case of the film-like identification device, preferably a passive Radio Frequency Identification Chip (RFID chip), at least one coil and a carrier. Such a data carrier can be manufactured in a relatively small format, thus making it easy to accommodate the data carrier in the slit-like gap in the electrically conductive layer of the identification device.

BRIEF DESCRIPTION OF THE DRAWINGS

Preferred embodiments of the invention will be discussed in more detail below with reference to the drawings, which show.

DETAILED DESCRIPTION OF PREFERRED EMBODIMENTS

The identification devices 10 shown in FIG. 1 to 7 have a panel-shaped identification device body 11 made of aluminum sheet. The identification device 10 has a rectangular configuration, with its dimensions conforming to those of a conventional motor vehicle license plate. The identification device body 11 is provided with a folded edge 13 running around its border 12. This folded edge 13 is pressed into the identification device body 11 by means of a forming operation, preferably by stamping.

Identification devices 10 of this type, commonly referred to as license plates or number plates, are usually attached to the front and back of a motor vehicle, specifically on the vehicle body and/or on the bumpers. For this purpose the identification device 10 has a number of mounting holes 15.

Within its front side 14 bounded by the folded edge 13 the identification device 11 is provided with an indicia area 22. Located in the indicia area 22 is indicia 23 of the identification device 10. Preferably, the indicia 23 is likewise applied to the indicia area 22 by stamping.

Figure 1:
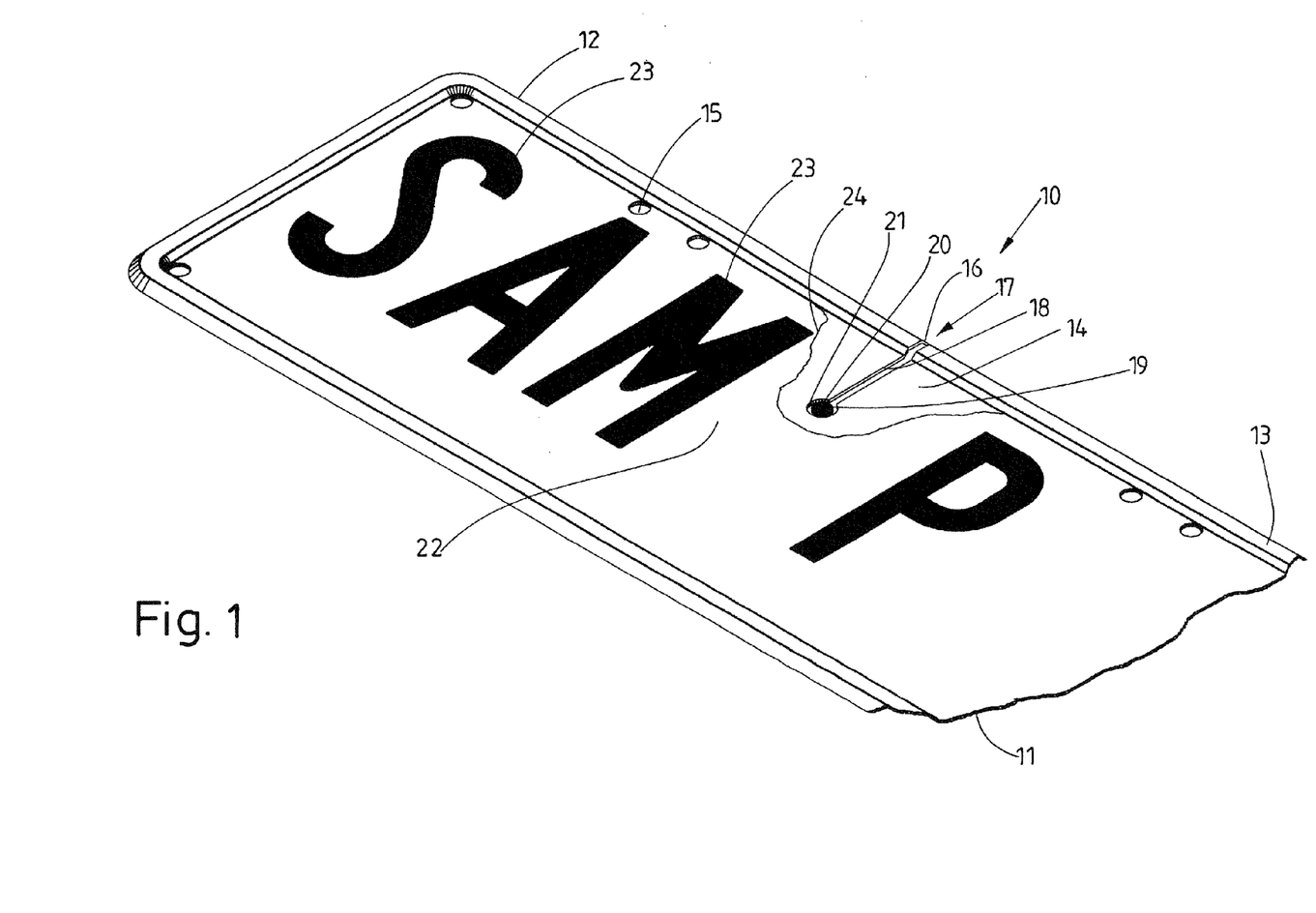
FIG. 1 shows an identification device according to the invention with an identification device carrier made of aluminum sheet and an integrated data carrier.
Figure 4:
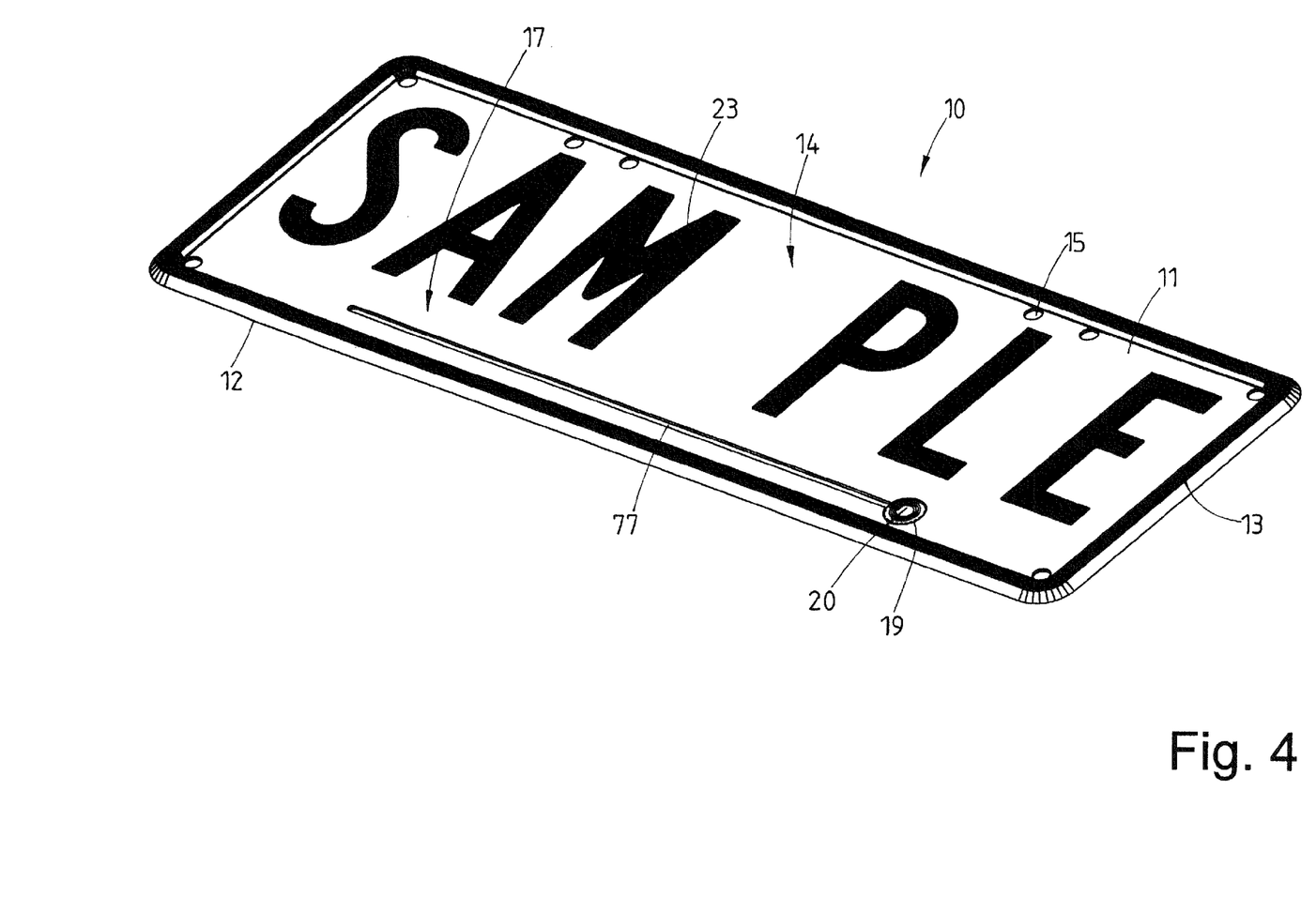
FIG. 4 shows a second exemplary embodiment of an identification device in a view according to FIG. 1.
Figure 5:
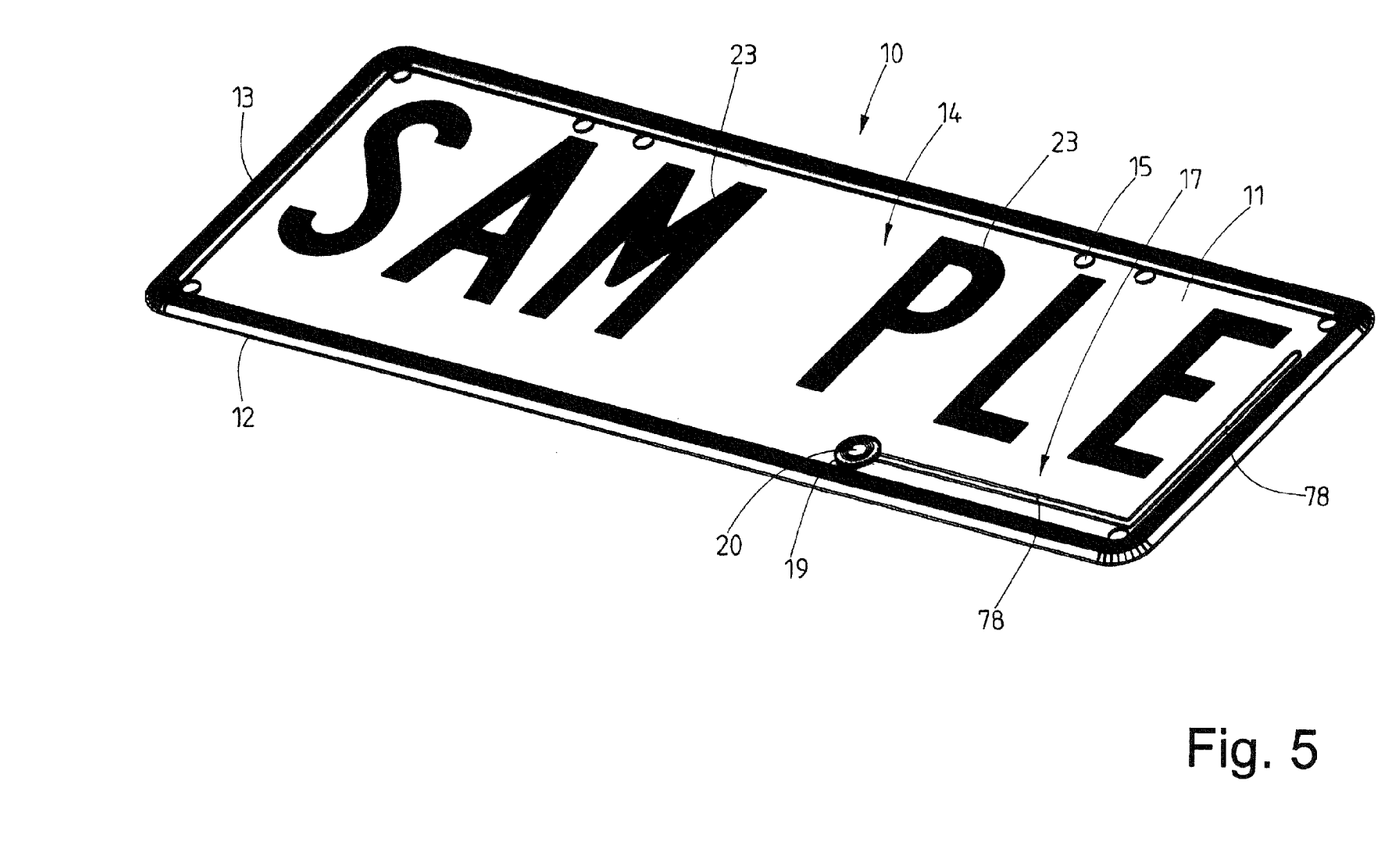
FIG. 5 shows a third exemplary embodiment of an identification device in a view according to FIG. 1.

The indicia may consist of arbitrary characters, i.e. it is not limited to the example shown in FIGS. 1, 4 and 5. In particular, any combination of letters, numbers and signs is possible in the composition of the indicia 23.

Figure 3:
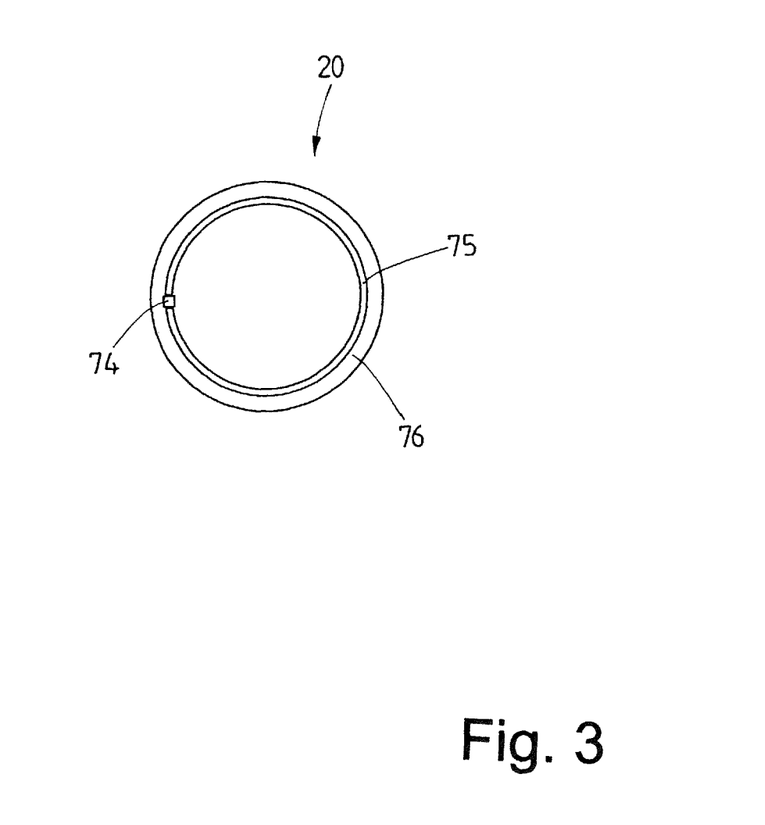
FIG. 3 shows a top view of the data carrier.

The identification device 10 is provided with a transponder. The transponder has an antenna 17 and a passive data carrier 20. The stored data of the data carrier 20 are readable via the antenna 17 in a contactless manner. The data carrier 20 contains selected data about the vehicle to which the identification device 10 belongs. The data carrier 20 is equipped with a passive chip 74, which here is configured as a passive Radio Frequency Identification Chip (RFID chip), a coil 75, which is connected to the chip 74 in a electrically conductive manner, and a carrier 76 made of nonconductive material, for example plastic, which can be configured as carrier film or a carrier body (FIG. 3). The passive RFID chip comprising the data carrier 20 operates in a frequency range of 800 MHz to 1,000 MHZ. The RFID chip generates a magnetic field that is inductively coupled via the antenna 17.

The antenna 17 has a slit 18 within the electrically conductive identification device body 11, namely in the aluminum sheet used to form the identification device body 11. The antenna 17 is thus formed by the identification device body 11 and the slit 18.

In the exemplary embodiment of FIG. 1, the slit 18 runs from a top edge 16 of the identification device body 11 approximately perpendicular to this top edge 16 into the identification device body 11. The slit 18 is thereby open at one end. However, the slit 18 can also proceed from any other edge of the identification device body 11. An opening 19 in the identification device body 11 is located at the end of the slit 18 opposite to the open end. This opening 19 enlarges the closed end of the slit 18 lying in the identification device body 11. Here the opening 19 corresponds to the shape or base area of the data carrier 20, thus making it possible for the data carrier 20 to be inserted in the opening 19, that is to say it is encompassed by the periphery surface 21 of the opening 19, with preferably a circumferential gap remaining between the opening 19 and the data carrier 20. The data carrier 20 is electrically insulated from the identification device body 11 by its nonconductive carrier 76. This arrangement leads to an inductive coupling of the data carrier 20 to the antenna 17.

In the identification device 10, the antenna 17, configured in the manner described above, acts at the same time as an amplifier for the signal of the chip 74, with the result that the relevant data of the chip 74 can be read at a relatively large distance from the identification device 10.

On its front side 14 provided with indicia 23, the identification device 10 has a coating executed as a self-adhesive and preferably reflective film 24. The film 24 covers the entire front side 14 of the identification device 10. The slit 18 with the opening 19 and the data carrier 20 are thereby also completely covered by the film 24. In the case of a reflective film 24 with metallic conducting components, it is provided that the reflective film 24 is supplied with a demetallized region 83 in the regions where the data carrier 20, the opening 19 and the slit 18 are located, or that its layer structure is altered such that the reflective film 24 is not conductive in the region of the data carrier 20, the opening 19 and the slit 18. Consequently, the reflective film 24 is completely nonconductive in the entire region of the slit 18 as well as that of the opening 19. Preferably, the reflective film 24 is also continuously nonconductive, in particular demetallized, in the marginal areas bordering the slit 18 and the opening 19 with the data carrier 20.

Arranged at the rear side 26 of the identification device body 11 is a nonconductive sticker 25. In the shown exemplary embodiment (FIG. 2) this sticker 25 covers at least the region of the slit 18 with the opening 19 and the data carrier 20 located within. However, the sticker 25 can also cover a larger area, or can be configured as a self-adhesive film which covers the entire rear side 26 of the identification device 10.

The height of the data carrier 20, in particular of the carrier 76, is approximately the same as the thickness of identification device body 11. It is thereby possible to accommodate the data carrier 20 within the opening 19 and fix it there such that it is located between and flush with the film 24 attached to the front side 14 and the sticker 25 attached to the rear side 26 (FIG. 2).

The carrier 76 shown in FIG. 3 has a round base area, specifically, one shaped like the opening 19. However, it is possible for the base areas of the carrier 76 and the corresponding opening 19 to assume different geometrical forms. The surface of the opening 19 geometrically matches the base area of the data carrier 20, namely that of its carrier 76. In the shown exemplary embodiment, the opening 19 is larger than the carrier 76, whereby the carrier 76 is surrounded by a circumferential gap.

Figure 2:
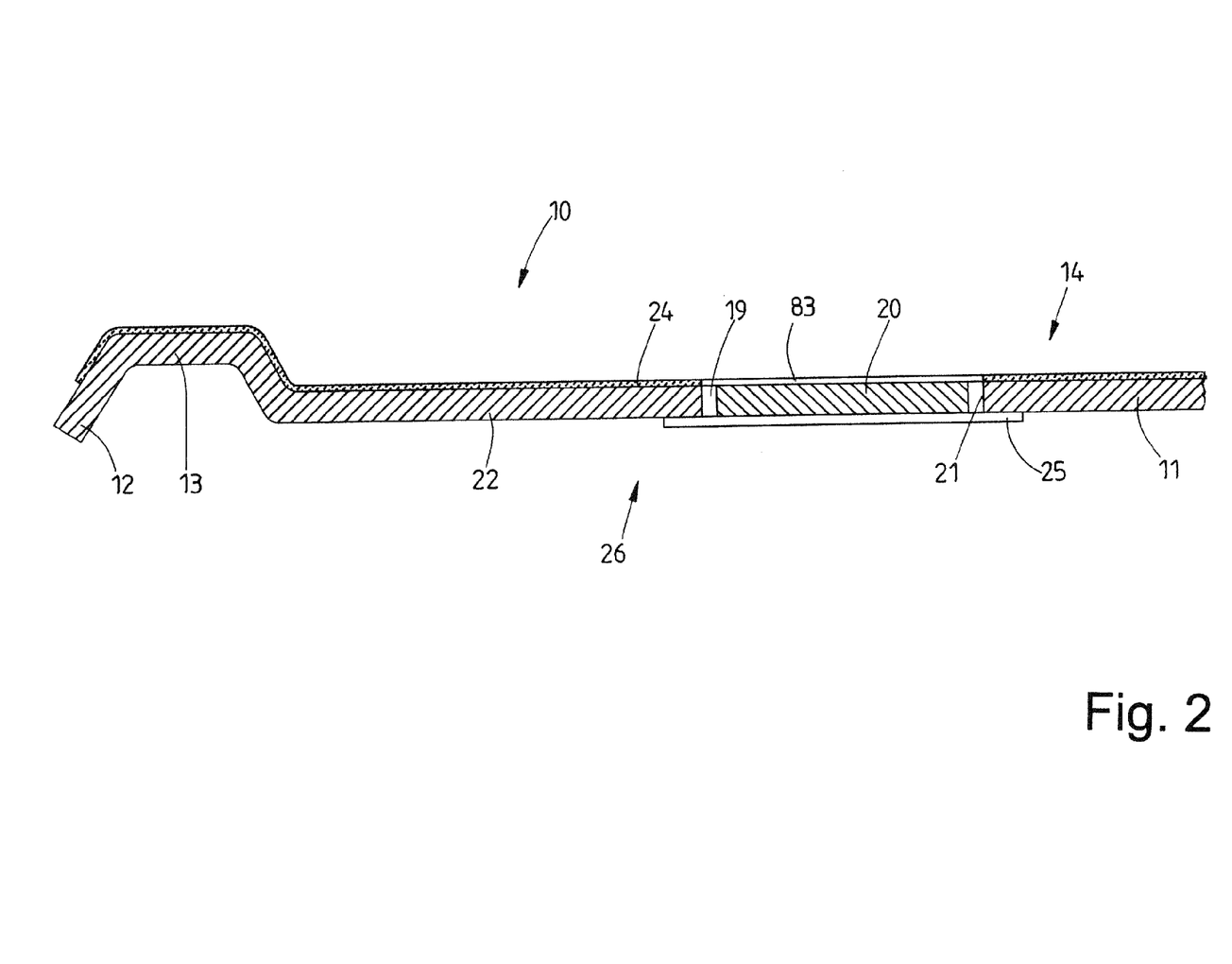
FIG. 2 shows a cross-section through the identification device of FIG. 1.

FIG. 4 shows an identification device 10 which differs from that of FIGS. 1 and 2 only with respect to a modified slit 77. Both ends of this slit 77 are closed. The slit 77 extends at a slight distance from and parallel to the lower longitudinal border of the identification device body 11, specifically in the region of the indicia area 22. In the shown exemplary embodiment, the rectilinear slit 77 lies between the indicia 23 and the folded edge 13 at the lower longitudinal border of the identification device 10.

One end of the slit 77 is assigned the opening 19, whose configuration corresponds to the base area of the data carrier 20, namely of a carrier 76. The opening 20 is configured as in the exemplary embodiment of FIGS. 1 and 2. The data carrier 20 corresponds to the data carrier 20 shown in FIG. 3.

The only difference between the identification device 10 of FIG. 5 and the identification device 10 of the previously described exemplary embodiments is that the slit 78 runs a different course. This slit 78 is also closed at both ends but bends at a right angle, specifically preferably at its middle point. Consequently, half of the slit 78 extends in the region of a longitudinal edge, while the other part of the slit 78 runs parallel to the shorter transverse edge of the identification device 10. Again a closed end of the slit 78 is assigned an opening 19, whose configuration corresponds to that of the data carrier 20. In the shown exemplary embodiment, the opening 19 with the data carrier 20 is located at that end of the angled slit 78 which is assigned to the longitudinal edge of the identification device body 11. However, the opening 19 with the data carrier 20 can also be located at that end of the slit 78 which is assigned to the shorter transverse edge of the identification device body 11. The opening 19 corresponds to that of the exemplary embodiment of FIG. 1. The data carrier 20 is also configured in the manner shown in FIG. 3. Reference is made here to the description of FIGS. 1 to 3.

Figure 6:
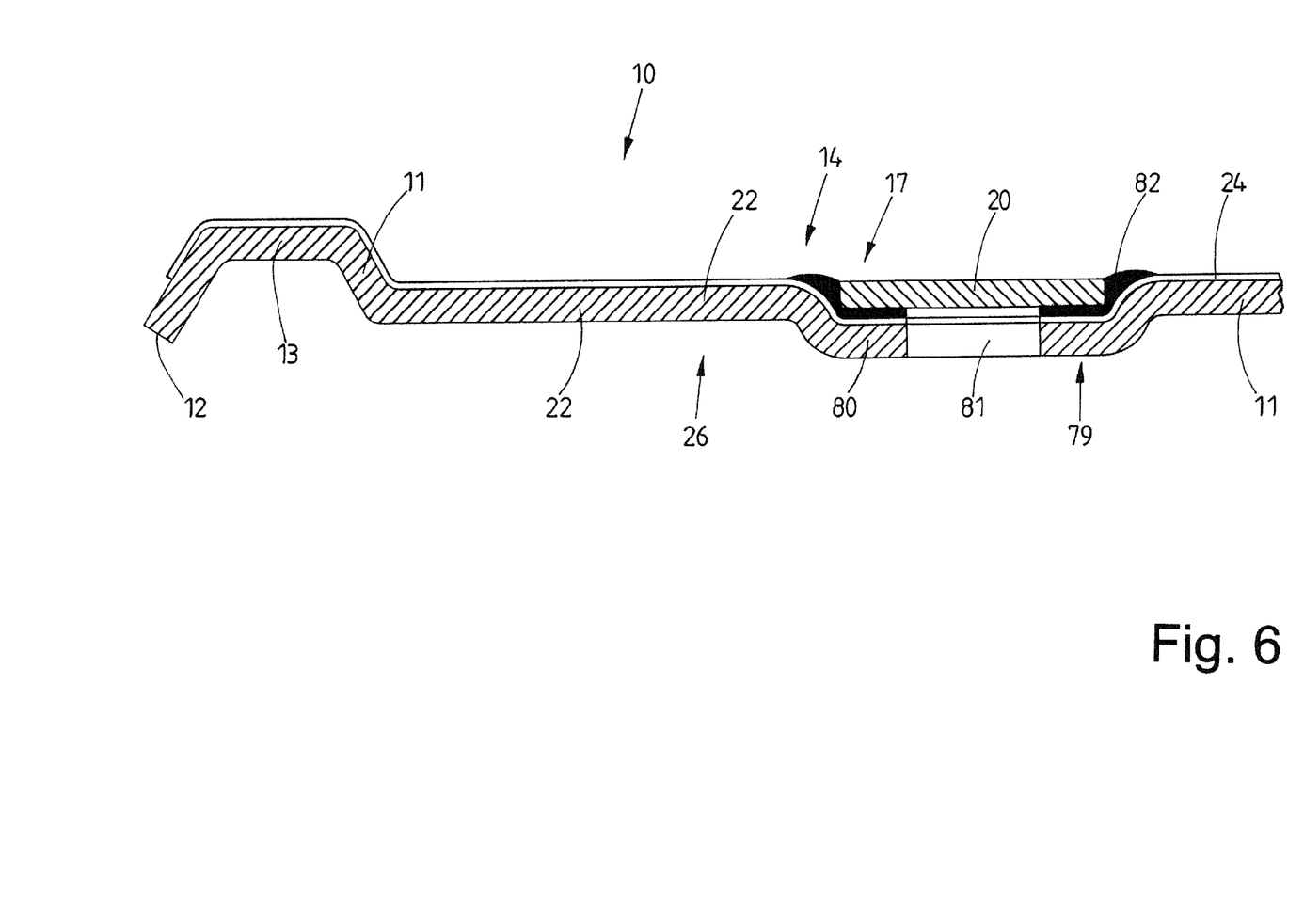
FIG. 6 shows a fourth exemplary embodiment of an identification device in a view according to FIG. 2.

The identification device 10 of FIG. 6 differs from the previously described identification devices in that the data carrier 20, which is basically of the same configuration as shown and described in FIG. 3, is arranged in a receiving depression 79. Like the folded edge 13, the receiving depression 79 is stamped into the identification device body 11 made of sheet metal, specifically being stamped from the front side 14 of the identification device body 11, with the receiving depression 79 thus being open on the front side 14 of the identification device 10. This allows the data carrier 20 to be inserted into the receiving depression 79 from the front side 14. The depth of the receiving depression 79 is selected so that the top side of the data carrier 20 pointing toward the front side 14 of the identification device 10 fits approximately flush with the front side 14 of the identification device 10.

The receiving depression 79 is assigned to an end of the slit in the identification device body 11. This end of the slit does not need to have any opening 19 since the opening 19 in this exemplary embodiment is replaced by the receiving depression 79. The receiving depression 79 can be located at one end of the slit 18, 77 or 78. The receiving depression 79 is stamped into the identification device body 11 at the end of the respective slit 18, 77 or 78, with a base wall 80 of the receiving depression 79 thereby having a continuous opening 81 formed by the end of the respective slit 18, 77 or 78. This opening 81, at least in its width, is smaller than the outer dimensions of the carrier 76 of the data carrier 20, whereby the data carrier 20 does not fit through the continuous opening 81 in the base wall 80 of the receiving depression 79.

In the shown exemplary embodiment, the receiving depression 79 is stamped into the identification device body 11 after its front side 14 has already been provided with the film 24. The film 24, which can be reflective film, thus extends across the base wall 80 of the receiving depression 79. In this case the data carrier 20 is mounted by means of a nonconductive compound, such as an adhesive 82, in the receiving depression 79, which is open at the top. In the shown exemplary embodiment, the adhesive 82 also fills out an interspace running around and encompassing the data carrier 20 between the outer walls of the carrier 76 and the comparatively larger receiving depression 79 so that the receiving depression 79 is completely filled out by the data carrier 20 and the adhesive 82 (FIG. 6). In the exemplary embodiment shown here, the film 24 in the region of the receiving depression 79 and data carrier 20 does not have to be demetallized. A label can be attached to the receiving depression 79 from the front side 14 of the identification device 10.

Figure 7:
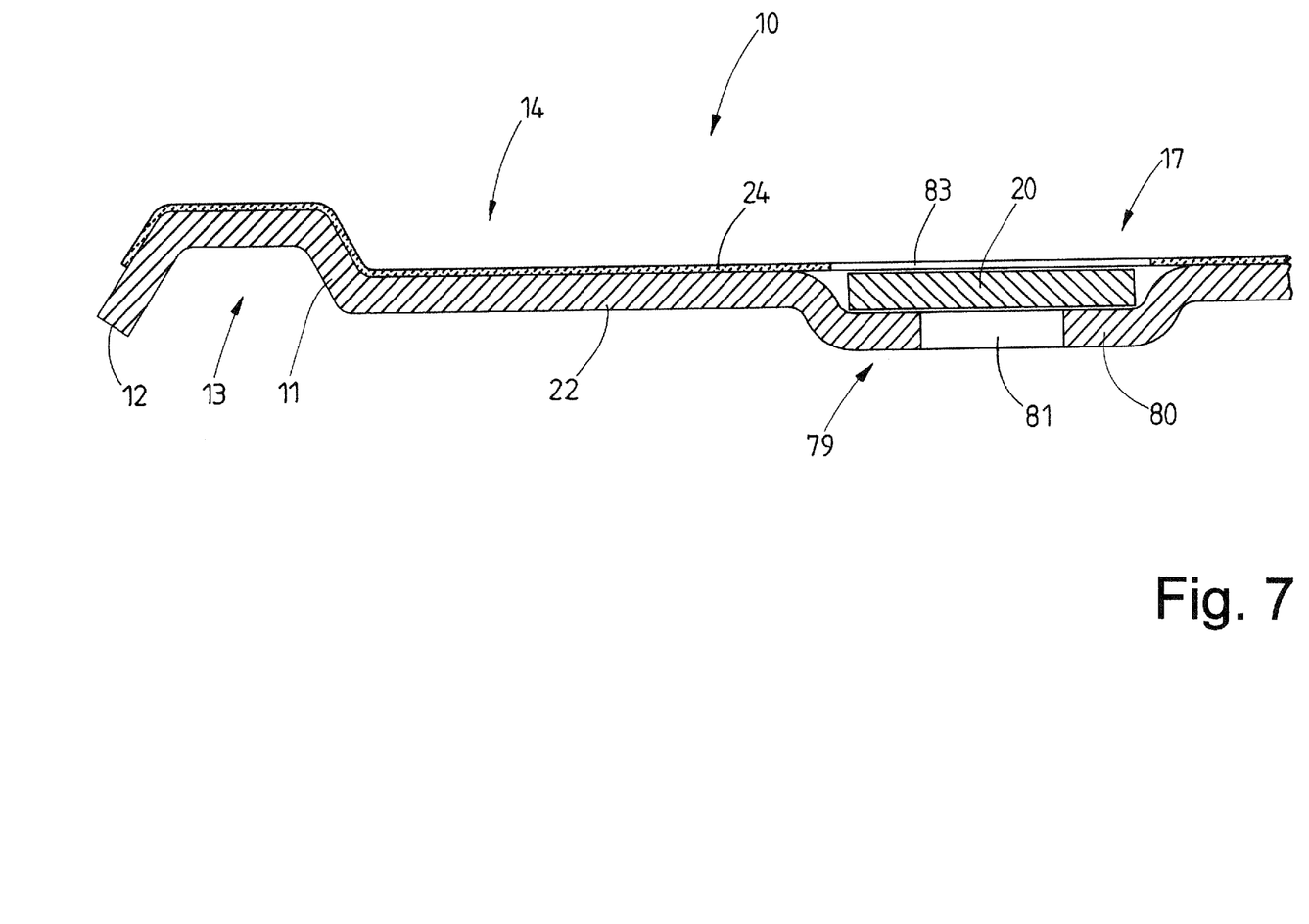
FIG. 7 shows a fifth exemplary embodiment of an identification device in a view according to FIG. 2.

FIG. 7 shows a further exemplary embodiment of the identification device 10 which, like the identification device of FIG. 6, has a receiving depression 79. The receiving depression 79 has a configuration which is exactly the same as that in the identification device 10 of FIG. 6, which is why it is provided with the same reference numbers. In particular, here too the base wall 80 of the receiving depression 79 has an opening 81, which is formed by one end of a slit 18, 77 or 78.

The exemplary embodiment of FIG. 7 deviates from the exemplary embodiment of FIG. 6 in that in FIG. 7 the receiving depression 79 is stamped in the identification device body 11 before the film 24 is applied to the front side 14 of the identification device body 11. Consequently, the inner side of the receiving depression 79 is not coated with the film 24. Instead, the data carrier 20 is inserted into the uncoated receiving depression 79. In this case, an electrically nonconductive insulation between the conductive sheet metal of the identification device body and the data carrier 20 is provided by the carrier 76, which is made of a nonconductive material. The data carrier 20 is also not firmly glued in the receiving depression 79. Instead, the data carrier 20 lies with its bottom side on the part of the base wall 80 which partially surrounds the opening 81, while the data carrier 20 is retained on its top side by the film 24, which in the case of the identification device 10 shown in FIG. 7 extends across the receiving depression 79, specifically in a planar manner. In the shown exemplary embodiment, the film 24 is a reflective film with conductive properties. For that reason the reflective film 24 in the region of the data carrier 20 and receiving depression 79 is electrically nonconductive by virtue of a demetallized region 83. The data carrier 20 arranged in the receiving depression 79 can therefore send amplified signals which can be received by a reader or similar apparatus at a relatively large distance from the identification device 10.

The slits 18, 77 and 78 have a width that is 1.5 to 2 times greater than the thickness of the sheet metal used to form the identification device body 11. Depending on the sheet metal thickness, it is therefore possible for the slit to have a width ranging from 1.5 mm to 2.5 mm, preferably approximately 2 mm. The length of the slit ranges from 100 mm to 200 mm, preferably approximately 160 mm. The diameter of the data carrier 20 lies in the range between 6 mm and 10 mm, preferably being approximately 8 mm. In the case of the identification device 10, the thickness of the data carrier 20, in particular that of the carrier 76, can correspond approximately to the thickness of the sheet metal of the identification device body 11.

Figure 8:
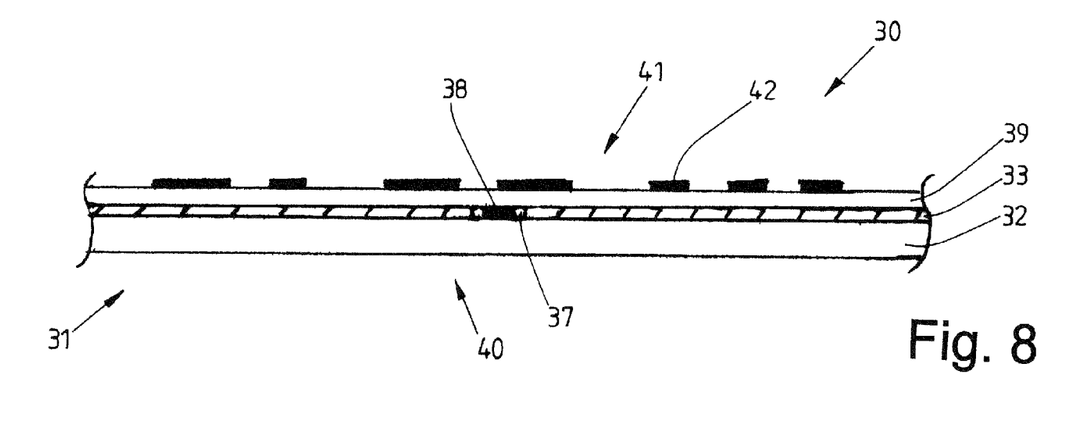
FIG. 8 shows a cross-section through a flat identification device pursuant to a sixth exemplary embodiment of the invention.

A further identification device 30 is shown in FIG. 8. The identification device 30 has the same format as the identification device 10 of FIGS. 1 to 7 representing a license plate. However, the identification device 30 is configured as a film-like identification label. Such identification labels are attached at the front and/or rear of a vehicle's body or on its front and/or rear bumper, specifically being held in a bracket or applied adhesively.

The identification device 30 has a passive data carrier 38 and possibly an antenna 36 as well, which serves as an amplifier. Here the antenna 36 and the data carrier 38 are designed in the same manner as the antenna 17 and the data carrier 20 in the previous exemplary embodiment, and fulfill the same respective functions with the same features.

The identification device 30 has a main body 31 that is formed by a plurality of layers. A nonconductive carrier layer 32 in this case is employed to stabilize the shape of the identification device 30. This thin or film-like carrier layer 32 is made of a thermoplastic synthetic material. One of its sides forms the rear side 40 of the identification device 30. An electrically conductive layer 33 is applied to the carrier layer 32, with a cover layer 39 being arranged over this electrically conductive layer 33 in order to protect it. In the shown exemplary embodiment the cover layer 39 is configured as a self-adhesive film with a reflective surface. At the front side 41 of the identification device 30, which is visible from the outside, indicia 42 is applied, for example imprinted, on the cover layer 39.

The electrically conductive layer 33 has a slit-like gap 34. In the region of this slit-like gap 34 the electrically conductive layer 33 is nonconductive. The slit-like gap 34 runs from an edge of the electrically conductive layer 33, preferably from the edge 35 of the identification device 30, approximately perpendicular to the edge 35, into the area of the identification device 30. The slit-like gap 34 is thus open at an end which lies on the edge of the identification device 30. In contrast, an opposite end of the slit-like gap 34 lying in the identification device 30 is closed. The slit-like gap 34 provides the electrically conductive layer 33 with the properties of an antenna 36, by means of which the chip 74 of the data carrier 38 can be read in a contactless manner.

The slit-like gap 34 has at its inner, closed end an enlargement 37 in the electrically conductive layer 33. Arranged in the region of this enlargement 37 is the data carrier 38. Here the enlargement 37 corresponds to the shape or base area of the carrier 38. Preferably, the enlargement 37 is somewhat larger than the data carrier 38 so that the data carrier 38 is annularly spaced from the borders of the enlargement 37.

The electrically conductive layer 33 is formed by the vaporization of an electrically conductive material onto a nonconductive film. The nonconductive film is not vaporized in the region of the slit-like gap 34 and the enlargement 37 so that no electrically conductive layer 33 is present in these regions and thereby forming the slit-like gap 34 and the enlargement 37. As an alternative, the gaps 34 and the enlargements 37 can also be formed by a demetallization of the overall electrically conductive layer 33.

The data carrier 38 is fixed within the enlargement 37 of the slit-like gap 34 in the electrically conductive layer 33 by the cover layer 39 on the side of the electrically conductive layer 33 and by the carrier layer 32 on the other side of the electrically conductive layer 33. The data carrier 38 is approximately just as thick as the electrically conductive layer 33 and can thereby be accommodated in the slit-like interruption 34 in such a manner that it does not project beyond the front and rear side of the electrically conductive layer 33 and is therefore not perceivable from the outside of the identification device 30. To this end the carrier 76 of the data carrier 38 has a film-like configuration.

In a deviation from the illustration in FIG. 8, the slit-like gap 34 can also be closed at both ends by being configured as a rectilinear strip or as an angled strip having the footprint of the slits 77 and 78 of FIGS. 4 and 5, respectively. The enlargement 37 is then arranged at one end of the slit-like gap 34.

Figure 9:
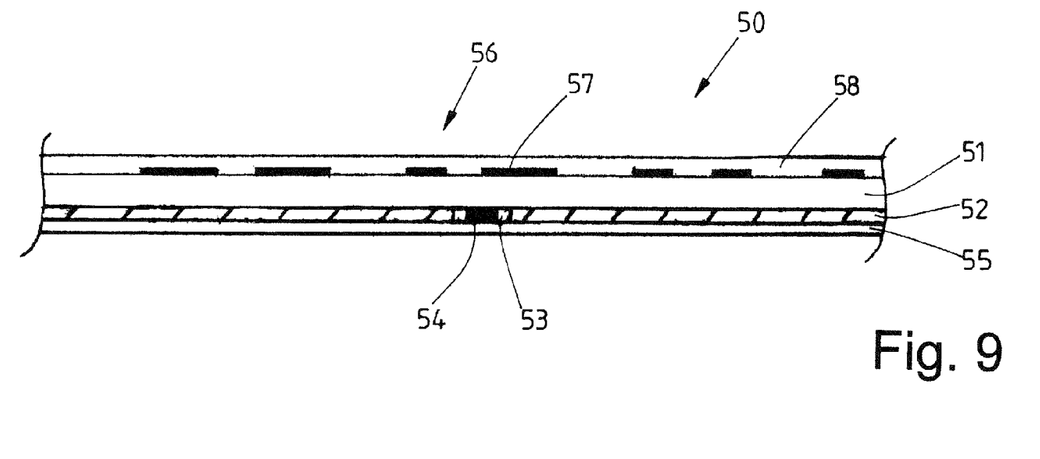
FIG. 9 shows a film-like identification device pursuant to a seventh exemplary embodiment of the invention in a cross-section view analogous to FIG. 8.

The constructive design of a further exemplary embodiment of a identification device 50 is shown in FIG. 9. The identification device 50, like the one in the previous exemplary embodiment (FIG. 8), is configured as a film-like identification label. The identification device 50 is also provided with a data carrier 54 and an antenna 59. In this case the data carrier 54 and the antenna 59 are designed in the same manner as the data carrier 38 and the antenna 36 of the exemplary embodiment of FIG. 8 and have the same characteristics.

The identification device 50 has a nonconductive carrier layer 51. An electrically conductive layer 52 is applied to this carrier layer 51. Arranged on the electrically conductive layer 52 is a nonconductive cover layer 55. This cover layer 55 comprises a self-adhesive film or paint layer.

Indicia 57 is provided, for example imprinted, on the front side 56 of the identification device 50, which is visible from the outside. An additional nonconductive protective layer 58 is provided to protect the indicia 57 from external mechanical influences. This protective layer 58 is transparent in order not to diminish the legibility of the indicia 57. In the shown exemplary embodiment it is a self-adhesive film, but can also be a paint layer.

The electrically conductive layer 52 has a gap 53 which forms the antenna 59, in other words, it namely has the effect that that the electrically conductive layer 52 serves as an antenna 59 and, if required, also as an amplifier. The gap 53 is, as in the previous exemplary embodiments, configured as a slit-like gap 53 that is open at one end and which has an enlargement at its closed end; however it can also be closed at both ends.

The passive data carrier 52 is inserted within the slit-like gap 53 of the electrically conductive layer 52. The data carrier 54 is spaced from all borders of the gap 53 and is thereby separated and insulated electrically and mechanically from the electrically conductive layer 52. In the case of the identification device 50, the carrier layer 51 and the cover layer 55 fix the data carrier 54 in the gap 53 due to the latter being arranged between the two layers.

Figure 10:
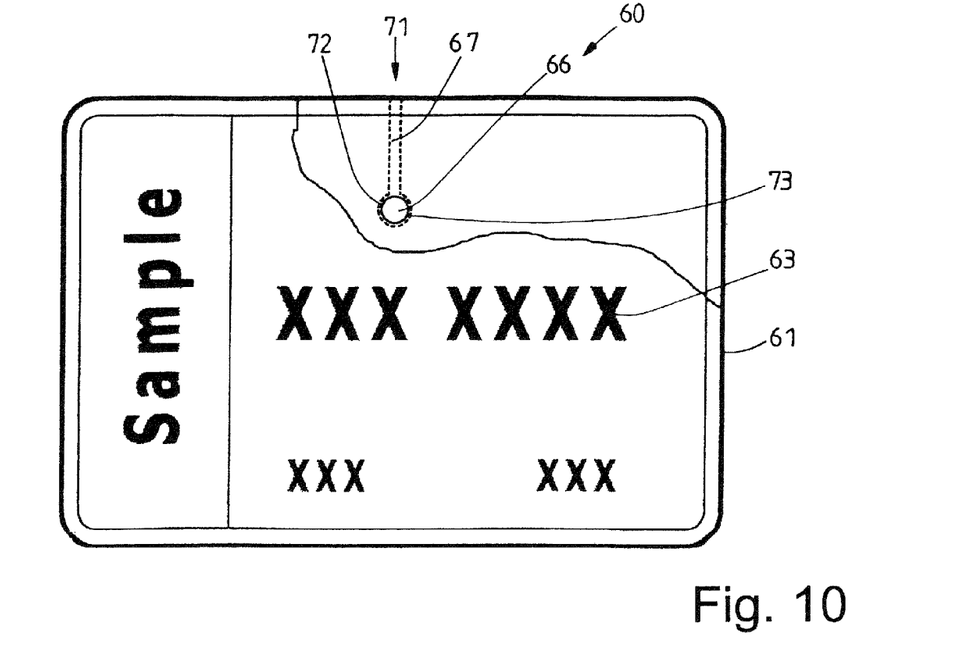
FIG. 10 shows a top view of a film-like identification device pursuant to a eighth exemplary embodiment of the invention.
Figure 11:
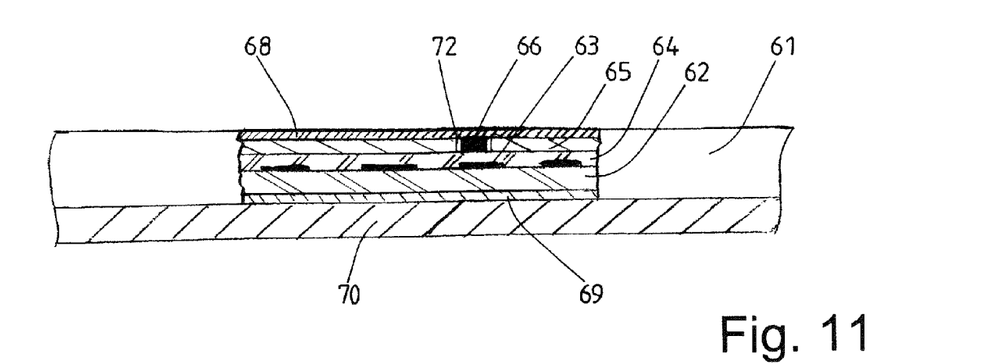
FIG. 11 shows a cross-section through the film-like identification device of FIG. 10.

A further exemplary embodiment of an identification device 60 according to the invention is shown in FIGS. 10 and 11. This identification device 60 can be smaller than the identification devices 10, 30, 50 of the previous exemplary embodiments. Such identification devices 60 are preferably affixed to a window pane of a vehicle as a supplementary identification. For example, the identification device 60 is adhesively affixed to the inner side of a windshield 70 so that it can be seen from outside the vehicle.

The identification device 60 has a data carrier 66 and an antenna 71. The data carrier, as in the case of the previously described exemplary embodiments, is a passive RFID chip 74 which operates in the frequency range of 800 MHz to 1.000 MHz and generates a magnetic field. The data carrier 66 also contains data relating to the vehicle to which the identification device 60 belongs. These data can be read contactlessly via the antenna 71.

The identification device 60 is also configured as a film-like identification device 60. It has a main body 61 which comprises a plurality of layers. Indicia 63 of the identification device 60 are applied to a nonconductive carrier layer 62. A nonconductive adhesive layer 64 is provided on the side of the carrier layer 62 bearing the indicia 63. An electrically conductive layer 65 is located on the carrier layer 62. The electrically conductive layer 65 is connected to the carrier layer 62 by means of the adhesive layer 64. In addition, the main body 61 has a nonconductive cover layer 68 which is applied over the electrically conductive layer 65.

In the shown exemplary embodiment the electrically conductive layer 65 comprises a metallic film or a nonconductive film vaporized with a metal layer. The electrically conductive layer 65 has a visible authenticity feature, for example a hologram, which is not represented in any further detail in the Figures. To ensure the visibility of the hologram and the indicia 63, the adhesive layer 64 and the carrier layer 62 are transparent.

The electrically conductive layer 65 has a slit-like gap 67. The slit-like gap 67 along with the electrically conductive layer 65 forms the antenna 71. The slit-like gap 67 is assigned to the data carrier 66, which is arranged in an enlargement 72 of the slit-like gap 67 within the electrically conductive layer 65. The electrically conductive layer 65 has an electrically nonconductive configuration in the regions of the slit-like gap 67 and the enlargement 72, as well as in the adjacent marginal regions if necessary, in that here a conductive coating is omitted or the electrically conductive layer 65 is demetallized. The data carrier 66 is spaced apart from all borders 73 of the enlargement 72 and is thereby at least electrically insulated from the electrically conductive layer 65. This thereby allows for a completely contactless inductive coupling of the data carrier 66 to the antenna 71 or to the electrically conductive layer 65 of the identification device 60.

The cover layer 68 fixes the data carrier 66 within the electrically conductive layer 65, thus making it inaccessible to tampering. In addition, the opaque cover layer 68 serves as an optical background for the hologram as well as for the indicia 63.

The identification device 60 is otherwise configured in such a manner that it is destroyed by any attempt to tamper with it or remove it from the windshield 70 of a vehicle.

LIST OF DESIGNATIONS 10 identification device
11 identification device body
12 border
13 folded edge
14 front side
15 mounting hole
16 top edge
17 antenna
18 slit
19 opening
20 data carrier
21 periphery surface
22 indicia area
23 indicia
24 film
25 sticker
26 rear side
30 identification device
31 main body
32 carrier layer
33 electrically conductive layer
34 slit-like gap
35 edge
36 antenna
37 enlargement
38 data carrier
39 cover layer
40 rear side
41 front side
42 indicia
50 identification device
51 carrier layer
52 electrically conductive layer
53 gap
54 data carrier
55 cover layer
56 front side
57 indicia
58 protective layer
59 antenna
60 identification device
61 main body
62 carrier layer
63 indicia
64 adhesive layer
65 electrically conductive layer
66 data carrier
67 slit-like gap
68 cover layer
69 adhesive layer
70 windshield
71 antenna
72 enlargement
73 border
74 chip
75 coil
76 carrier
77 slit
78 slit
79 receiving depression
80 base wall
81 opening
82 adhesive
83 demetallized region

What is claimed is:

1. An identification device for a vehicle comprising:
a flat, at least partially electrically inductive identification device body (11), the identification body (11) having at least one slit (18, 77, 78), at least one indicia area (22), and at least one indicia (23), wherein the at least one indicia (23) is assigned to the indicia area (22) of the identification device body (11);
a data carrier (20) assigned to the identification device body (11), wherein the data carrier (20) is contactlessly readable, and wherein the data carrier (20) generates a magnetic field; and
an antenna (17), wherein the antenna (17) is formed by the identification device body (11) and the at least one slit (18, 77, 78),
wherein the data carrier (20) is inductively coupled to the slit (18, 77, 78),
wherein the data carrier (20) has a passive radio frequency identification chip (74), at least one coil (75) connected electroconductively to the chip (74), and a carrier (76) made of an insulating or nonconductive material, and
wherein the antenna (17) also is an amplifier for a signal generated by the chip (74), whereby relevant data of the chip (74) is read at a relatively large distance from the identification device.

2. The identification device according to claim 1, wherein the data carrier (20) is assigned to the slit (18, 77, 78) in an electrically insulated manner in the region of an end of the slit (18, 77, 78).

3. The identification device according to claim 1, wherein the data carrier (20) is arranged in an insulated manner within the slit (18, 77, 78) or above the slit (18, 77, 78), with electrically conductive components of the data carrier (20) being spaced from periphery surfaces (21) of the slit (18, 77, 78).

4. The identification device according to claim 1, wherein the slit (18, 77, 78) has an opening (19) enlarging the slit (18, 77, 78) in the region of a closed end of the slit (18, 77, 78).

5. The identification device according to claim 4, wherein the data carrier (20) is situated in the region of an opening (19) in the slit (18, 77, 78) in the identification device body (11).

6. The identification device according to claim 5, wherein the data carrier (20) is embedded in the slit (18, 77, 78) or in the opening (19), by at least one coating (24) on the identification device body (11).

7. The identification device according to claim 6, wherein at least one visible coating (24) is configured as a self-adhesive reflective film, which is configured in the region of at least one of the data carrier (20), the opening (19), and the slit (18, 77, 78), in such a manner that it has no conductive components.

8. The identification device according to claim 1, wherein the data carrier is disposed in a receiving depression (79) in the identification device body (11), with the receiving depression (79) being assigned to an end of the slit (18, 77, 78).

9. The identification device according to claim 8, wherein the receiving depression (79) has a base wall (80) into which one end of the slit (18, 77, 78) extends.

10. The identification device according to claim 8, wherein the receiving depression (79) has a base wall (80), the base wall (80) having an opening (81) which is smaller than the data carrier (20).

11. The identification device according to claim 1, wherein the identification device body (11) comprises an electrically conductive metallic material.

\* \* \* \* \*